Patented Oct. 15, 1935

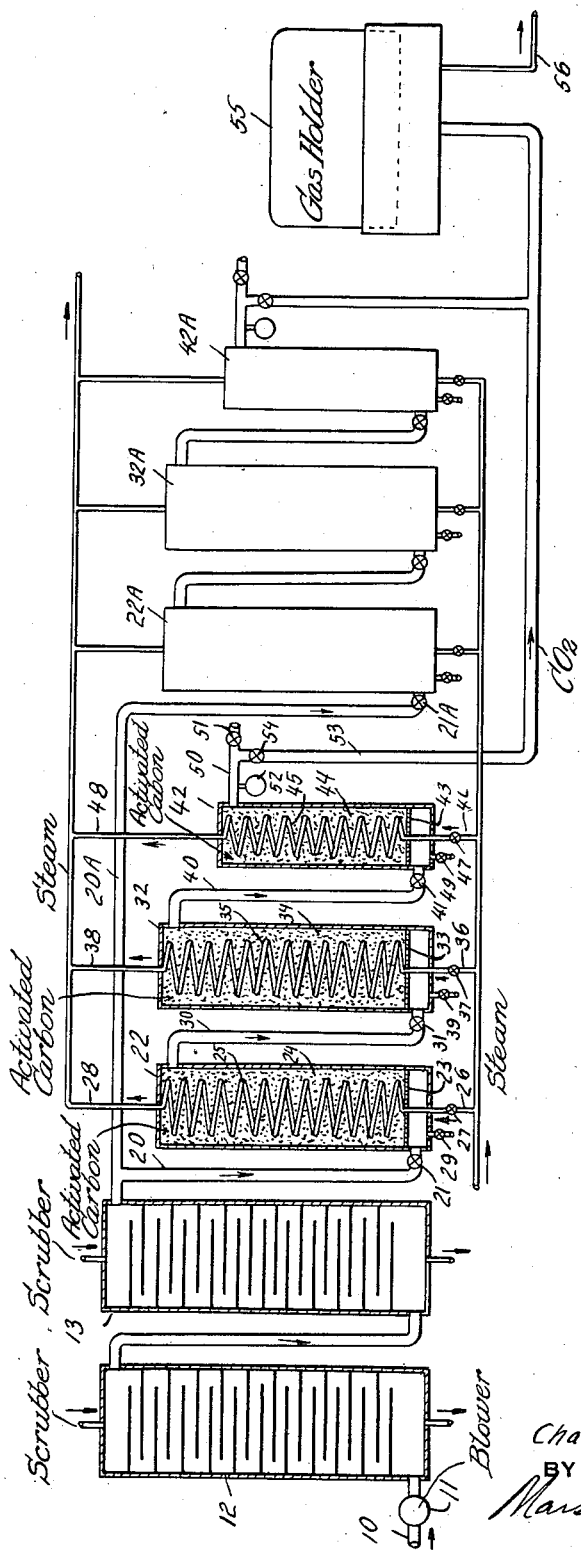

2,017,779

UNITED STATES PATENT OFFICE 2,017,779

PROCESS FOR RECOVERING CARBON DIOXIDE FROM A GAS MIXTURE

Charles H. Vosburgh, Forest Hills, N. Y., assignor to Harry W. Cole, New York, N. Y.

Application April 18, 1931, Serial No. 531,157

4 Claims. (Cl. 23—150)

This invention relates to improvements in processes for recovering carbon dioxide from a gas mixture and particularly to a process for so raising the percentage of carbon dioxide in a low percentage gas, that the gas so raised in percentage of carbon dioxide may be suitable for many commercial uses.

The object of this invention is to provide a process by means of which a gas with varying amounts of carbon dioxide may be so treated that it may have a high percentage of carbon dioxide and may be suitable for carbonating beverages, for refrigeration, for making solid carbon dioxide and for other purposes.

While this process is capable of being carried out in many different ways, for the purpose of illustration, I shall describe only one of them, and while it is capable of being carried out in connection with many different types of apparatus, I have shown only one type of apparatus for use in connection therewith.

In carrying out my invention the gas containing the carbon dioxide which is to be treated in accordance with my invention, may be produced in the burning of coal, coke or oil, in fermentation process, or any process in which carbon dioxide is given off as a by-product.

The drawing is a diagrammatic representation of an apparatus by which my novel process can be carried out.

10 designates a conduit for the gas from which the $CO_2$ is to be obtained. 11 is a blower which passes the gas through the whole system. The gas first passes through a scrubber 12 containing coke or other inert material, over which water flows to remove dust and to cool the gas. Then it flows through a second scrubber 13 which also contains an inert material such as coke, over which flows a stream of soda solution to remove sulphur compounds. These scrubbers and other devices for cleaning the gas may be of any desired type and their type is not germane to my invention. The soda solution in the scrubber 13 absorbs a certain amount of carbon dioxide and forms sodium carbonate after which no more carbon dioxide will be taken up. Thereafter, the sodium bi-carbonate absorbs the sulphur compounds.

From the last scrubber the gas passes through a conduit 20 in which is a valve 21 to a primary accumulator tower 22. 23 is a perforated plate near the base of this tower which supports a mass 24 of dry material capable of selectively adsorbing $CO_2$. Activated carbon obtained by heating cocoanut shells is one of the materials which are suitable for this purpose. A coil of pipe 25 is embedded in this mass. 26 is a steam supply pipe connected with the end of the coil and 27 is a valve for controlling the steam. 28 is a steam outlet. 29 is a drain valve in the bottom of tower 22 for draining off any water or other liquid which may settle there.

The gas from the top of tower 22 passes through a conduit 30 and valve 31 into the bottom of a secondary tower 32 having a perforated plate 33 and containing a mass of adsorbent material 34 similar to that in tower 22 and having embedded therein a pipe coil 35. 36 is the steam supply pipe for coil 35, 37 its control valve and 38 its exhaust. A drain valve 39 is in the bottom of tower 32.

From the top of the secondary tower 32 the gas is led through a conduit 40 and valve 41 to the bottom of a final accumulator tower 42 of smaller dimensions. This is provided with parts similar to those in towers 22 and 32 and designated respectively by the numerals 43, 44, 45, 46, 47, 48 and 49.

50 is a conduit leading from the top of tower 42 through a valve 51 to the atmosphere or to a stack, if desired. 52 is a $CO_2$ testing indicator or gauge connected with the conduit 50. 53 is a branch conduit leading from the conduit 50 to a gas holder 55. 54 is a valve in conduit 53. The outlet pipe from the gas holder is designated by 56.

Before pointing out the other parts of the drawing, I will describe my process. As the gas passes through the towers 22, 32 and 42, the $CO_2$ therein is removed and adsorbed in the activated carbon in them. I make use of the known characteristic of this material, that it is capable of adsorbing many times its own volume of $CO_2$. Other gases which it is not desired to retain, pass off through the conduit 50. Hydrogen sulphide and sulphur dioxide are even more readily adsorbed than is carbon dioxide in such material as that of the mass 24. Therefore, when the gas initially supplied to the apparatus contains such sulphur compounds, they must be removed before the gas is led into the first tower 22. This is done in the scrubber 13 by the usual absorption process. So, as in the case of the example given of the specified more readily adsorbed gases, where other gases more readily adsorbed than carbon dioxide are initially present in substantial percentage in the carbon dioxide containing gas mixture, such more readily adsorbed gases may be removed prior to the entry of the gas mixture into the first or primary accumulator tower, such as tower 22 of the illustrated apparatus. After the activated carbon in the three towers has adsorbed all the $CO_2$ it is capable of holding under the existing conditions of $CO_2$ percentage or concentration in the gas mixture the valve 21 is closed and the gas from the scrubbers diverted through another course.

Then steam valve 27 is opened and steam at a pressure of about 125 pounds with a temperature of about 350° F. is passed through the coil 25 in tower 22. The gas which has been accumulated in the mass 24 is driven off by the heat thus generated and passes into towers 32 and 42 in which the adsorption of $CO_2$ increases and more of the undesired gases are allowed to escape through the conduit 50.

After the gas has been driven out of tower 22, valve 31 is closed and steam passed through coil 35 to drive the gas out of the activated carbon in tower 32 into tower 42 in which the adsorption of $CO_2$ increases and more of the undesired gases are allowed to escape through conduit 50. The proportion of $CO_2$ in the gas in tower 32 is much higher than it was in the gas which had been in tower 22. Thereafter valve 41 is closed and the gas accumulated in tower 42, which is nearly pure $CO_2$, is driven out by passing steam through its coil 45.

When the gas passing through conduit 50 from the last tower 42 is $CO_2$ of the required purity, as will be indicated by the gauge 52, valve 54 is opened and valve 51 closed. This permits the pure $CO_2$ adsorbed in the last tower 42 to pass into the holder 55 from which it may be withdrawn at will through pipe 56.

The fact that the activated carbon will adsorb only a definite amount of carbon dioxide from a gas mixture having a certain percentage of carbon dioxide therein, but will adsorb a greater amount of carbon dioxide gas when the percentage of carbon dioxide in the mixture is increased, would appear due to the probable establishment of an equilibrium between the amount of carbon dioxide adsorbed and the other gases in the mixture. Hence, when the gas mixture surrounding the activated carbon particles contains a higher percentage of carbon dioxide, this equilibrium is disturbed and more carbon dioxide displaces the other gases that are less readily adsorbed than the carbon dioxide, and which were adsorbed with the carbon dioxide under the prior conditions, and a further adsorption of carbon dioxide gas by the activated carbon results.

When the valve 21 is closed, valve 21A is opened to allow the gas from the scrubbers to pass through towers 22A, 32A and 42A, which are duplicates of towers 22, 32 and 42, where the $CO_2$ is accumulated and from which it is expelled while the first towers are being heated, in the manner previously described. Thus the process is continuous.

One of the advantages of this process is the low cost of installation required for its practice. Another advantage is its efficiency and cheapness of operation which makes it adaptable for the recovery of $CO_2$ from sources such as ordinary flue gas, which could not be done economically before. Moreover, the periodic heating of the carbon in the accumulator towers causes it to retain its activity almost indefinitely and it is so disposed that it may be revivified without removal from the towers by merely passing steam through the coils at any temperature desired for this purpose.

While I have described my invention in some detail, I wish it to be understood that many changes may be made therein without departing from its spirit and scope and I intend no limitations other than those imposed by the appended claims.

What I claim is:

1. A process of recovering carbon dioxide from a gas mixture of carbon dioxide and gas less readily adsorbed than the carbon dioxide, including passing said gas mixture through a plurality of carbon dioxide adsorption material masses contained in interconnected serially arranged enclosed spaces, respectively, and permitting the unadsorbed gas to escape; then consecutively expelling the adsorbed gas from each mass and progressively forcing it through the following masses of the series for adsorption thereby, while allowing unadsorbed gas to escape, until carbon dioxide gas from the preceding masses is concentrated in the last mass of the series; and finally expelling the adsorbed carbon dioxide from said last mass and collecting the expelled carbon dioxide.

2. A process of recovering carbon dioxide by raising the percentage thereof in a gas mixture of carbon dioxide and a gas less readily adsorbed than the carbon dioxide, that includes; passing said gas through a plurality of masses of dry material adapted to selectively adsorb carbon dioxide in a series of interconnected enclosed spaces and permitting the unadsorbed gas to escape from said spaces; consecutively closing the gas inlet ends of said spaces and heating the masses therein consecutively to progressively expel adsorbed gas from each heated mass and force the same through the following masses of the series while allowing unadsorbed gas to escape from the spaces; and collecting gas, expelled by heating the last of said spaces, in a suitable gas holder.

3. A process of recovering carbon dioxide by raising the percentage thereof in a gas mixture of carbon dioxide and gas less readily adsorbed than the carbon dioxide, that includes the steps of; passing said gas mixture through a plurality of carbon dioxide adsorption material masses contained in a series of interconnected enclosed spaces, respectively, until a desired adsorption of carbon dioxide by said masses is attained, while permitting the unadsorbed gas to pass off from said spaces; shutting off the supply of said gas to the series of adsorption material enclosing spaces; then consecutively heating each of the series of adsorption material masses progressively one after the other to expel adsorbed gas from each mass as heated and force the expelled gas through the next remaining unheated masses for further selective carbon dioxide gas adsorption thereby, while allowing unadsorbed gas to escape from the said remaining spaces; then heating the last adsorption mass of the series to expel therefrom the adsorbed high percentage carbon dioxide gas collectively adsorbed therein; and collecting the gas of the desired percentage of carbon dioxide as expelled from said last mass of the series.

4. A process of recovering carbon dioxide from a gas mixture of carbon dioxide and gas less readily adsorbed than the carbon dioxide, including the steps of; passing said gas through a plurality of carbon dioxide adsorption material masses contained in a series of interconnected enclosed spaces, respectively, of which the last mass is smaller than the one preceding it; continuing passage of the gas through said masses while permitting unadsorbed gas to escape from the enclosing spaces, until the desired adsorption of carbon dioxide by the masses is attained; shutting off the supply of said gas to the series of mass enclosing spaces; then consecutively heating each of the series of adsorption masses progressively toward said smaller last mass of the series, one after the other to expel adsorbed gas from each mass and force it through the next remaining unheated masses of the series for further selective carbon dioxide adsorption thereby, while allowing unadsorbed gas to escape from the enclosing spaces, until there is a concentration of the expelled adsorbed gas of the preceding masses adsorbed in the smaller last mass of the series; finally heating the last mass of the series to expel therefrom the high percentage carbon dioxide gas collectively adsorbed therein; and collecting the expelled gas in a suitable gas receptacle.

CHARLES H. VOSBURGH.